US012163608B2

(12) United States Patent
Hillinger

(10) Patent No.: US 12,163,608 B2
(45) Date of Patent: Dec. 10, 2024

(54) EXTENSION ASSEMBLY FOR A FIRE SUPPRESSION SPRAY NOZZLE

(71) Applicant: Emergency Vehicle Center & American Fire Equipment, Lawton, IA (US)

(72) Inventor: Craig D. Hillinger, Bronson, IA (US)

(73) Assignee: Emergency Vehicle Center & American Fire Equipment, Bronson, IA (US)

( * ) Notice: Subject to any disclaimer, the term of this patent is extended or adjusted under 35 U.S.C. 154(b) by 0 days.

(21) Appl. No.: 17/695,425

(22) Filed: Mar. 15, 2022

(65) Prior Publication Data

US 2022/0299139 A1    Sep. 22, 2022

Related U.S. Application Data

(60) Provisional application No. 63/163,206, filed on Mar. 19, 2021.

(51) Int. Cl.
*F16L 33/20* (2006.01)
*F16L 9/22* (2006.01)

(52) U.S. Cl.
CPC ............... *F16L 33/20* (2013.01); *F16L 9/22* (2013.01)

(58) Field of Classification Search
CPC ... F16L 15/006; F16L 9/22; F16L 9/04; F16L 13/0209; F16L 13/0254; F16L 13/0272; F16L 33/20
See application file for complete search history.

(56) References Cited

U.S. PATENT DOCUMENTS

| 1,672,879 | A | * | 6/1928 | Campbell, Jr. | ........ F16L 15/006 29/520 |
| 1,955,930 | A | * | 4/1934 | Oliver | ................... F16L 33/222 285/259 |
| 3,232,638 | A | * | 2/1966 | Hollander | ............... E21B 17/16 175/320 |
| 3,520,561 | A | * | 7/1970 | Rininger | ............... F16L 15/006 285/24 |
| 4,026,583 | A | * | 5/1977 | Gottlieb | ............... F16L 58/182 285/55 |
| 4,055,338 | A | * | 10/1977 | Dyer | ....................... E21B 17/07 175/325.2 |
| 4,073,512 | A | * | 2/1978 | Vian | ..................... F16L 19/028 285/12 |

(Continued)

OTHER PUBLICATIONS

Conway Shield, HydroVent 46" Extension—Red—1.5" NST, https://www.conwayshield.com/fire/hydrovent-46-extension-red-1-5-nst.html, Retrieved Mar. 12, 2024, United States.

(Continued)

*Primary Examiner* — David Bochna
(74) *Attorney, Agent, or Firm* — BrownWinick Law Firm; Jordan E. Meggison-Decker

(57) ABSTRACT

An extension assembly for a fire suppression spray nozzle is provided. A tube having a first end and a second end is welded to a female hose coupler at the tube's first end. A male hose coupler is welded to the second end of the tube. A support sleeve connected to the female hose coupler inserts into a fire suppression spray nozzle or another instance of the extension assembly to provide for easy alignment of the threaded connectors and for adding strength to the connection.

4 Claims, 5 Drawing Sheets

(56) References Cited

U.S. PATENT DOCUMENTS

| | | | | | |
|---|---|---|---|---|---|
| 4,173,989 | A | * | 11/1979 | Prest | F16L 25/14 |
| | | | | | 285/179 |
| 4,192,155 | A | * | 3/1980 | Gray | E21B 17/07 |
| | | | | | 175/321 |
| 4,759,738 | A | * | 7/1988 | Johnson | E21B 17/07 |
| | | | | | 175/321 |
| 8,684,851 | B2 | * | 4/2014 | Slack | E21B 17/07 |
| | | | | | 464/163 |
| 10,024,466 | B2 | * | 7/2018 | Lang | E21B 17/023 |
| 2004/0256497 | A1 | * | 12/2004 | Sharkey | A62C 31/02 |
| | | | | | 239/569 |
| 2012/0024547 | A1 | * | 2/2012 | Orr | A62C 37/09 |
| | | | | | 239/282 |
| 2013/0186669 | A1 | * | 7/2013 | Chabas | E21B 17/028 |
| | | | | | 174/47 |
| 2017/0043195 | A1 | * | 2/2017 | Hughes | A62C 37/14 |

OTHER PUBLICATIONS

Conway Shield, HydroVent Plus Complete Unit Package—HV1501—COM—NST15—Plus, https://www.conwayshield.com/fire/hydrovent-plus-complete-unit-package-hv1501-com-nst15-plus.html, Retrieved Mar. 12, 2024, United States.

\* cited by examiner

EXTENSION ASSEMBLY FOR A FIRE SUPPRESSION SPRAY NOZZLE

CROSS-REFERENCE TO RELATED APPLICATIONS

This patent application claims priority to U.S. Provisional Patent Application No. 63/163,206 filed on Mar. 19, 2021, the entirety of which is incorporated herein fully by reference.

FIELD OF THE DISCLOSURE

This disclosure relates generally to nozzle devices, and in particular to an assembly for extending the reach of a fire suppression spray nozzle.

BACKGROUND OF THE DISCLOSURE

Extinguishing a fire typically involves applying water or extinguishing foam to the fire. Ideally, firefighters are able to access the seat of the fire to apply water or foam directly to the seat of the fire, resulting in relatively quick and straightforward extinguishment.

Many fires are difficult to extinguish due to inability to adequately access the seat of the fire. This inability can be caused by many factors, including closed cavity spaces, weakened and dangerous structural conditions due to total elapsed fire duration, heavy fire conditions, the number of firefighters at the scene, and weather conditions that can interfere with operation of fire hoses and other equipment. In some cases, conditions at the scene of a fire create the need to conduct exterior only fire suppression. Fighting a fire from the exterior only can cause extinguishment to take longer than in a scenario where firefighters can apply water or foam directly to the seat of the fire. In addition to increased property damage that occurs the longer a fire continues to burn, firefighters' and fire victims' exposure to dangerous fire, smoke, carcinogens, and heat increases as extinguishment efforts continue.

For the reasons stated above, and for other reasons which will become apparent to those skilled in the art upon reading and understanding the specification, there is a need in the art for an extension assembly for a fire suppression spray nozzle that allows for more efficient extinguishment of fires from a safer exterior position.

These and other objects, features, or advantages of the present disclosure will become apparent from the specification and claims.

BRIEF SUMMARY OF THE DISCLOSURE

The disclosure relates to an extension assembly for a fire suppression spray nozzle. In one arrangement, an extension assembly comprises an aluminum tube welded onto a male hose coupler at one end of the aluminum tube and onto a female hose coupler at the other end of the aluminum tube. The aluminum tube and hose couplers are hard-coat anodized. A stainless alignment support sleeve is inserted in the female hose coupler providing for easy assembly and added strength to the joint.

DETAILED DESCRIPTION

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

The inventor has been in the fire service for over 20 years as a firefighter and officer Over the years, he has worked many fires that were very hard to extinguish. A significant fire the inventor responded to was on New Year's Eve day 2017. It was a two story residential dwelling and due to heavy fire conditions and severely cold temperatures, causing many issues with lines and trucks freezing, the decision to conduct exterior only fire suppression was made. Due to the many angles, and closed cavities of the structure, and general fire extension within the structure, extinguishment took several hours. It was a very frustrating incident for all responders present. After that fire, the inventor became determined to develop a nozzle that could have reduced this overall time significantly, and later designed the extension assembly 100 described in this application to extend the reach of fire nozzles into structures that cannot be entered and to increase the distance of firefighters from the hazards associated with a fire.

Extension Assembly 100

Figure 1:
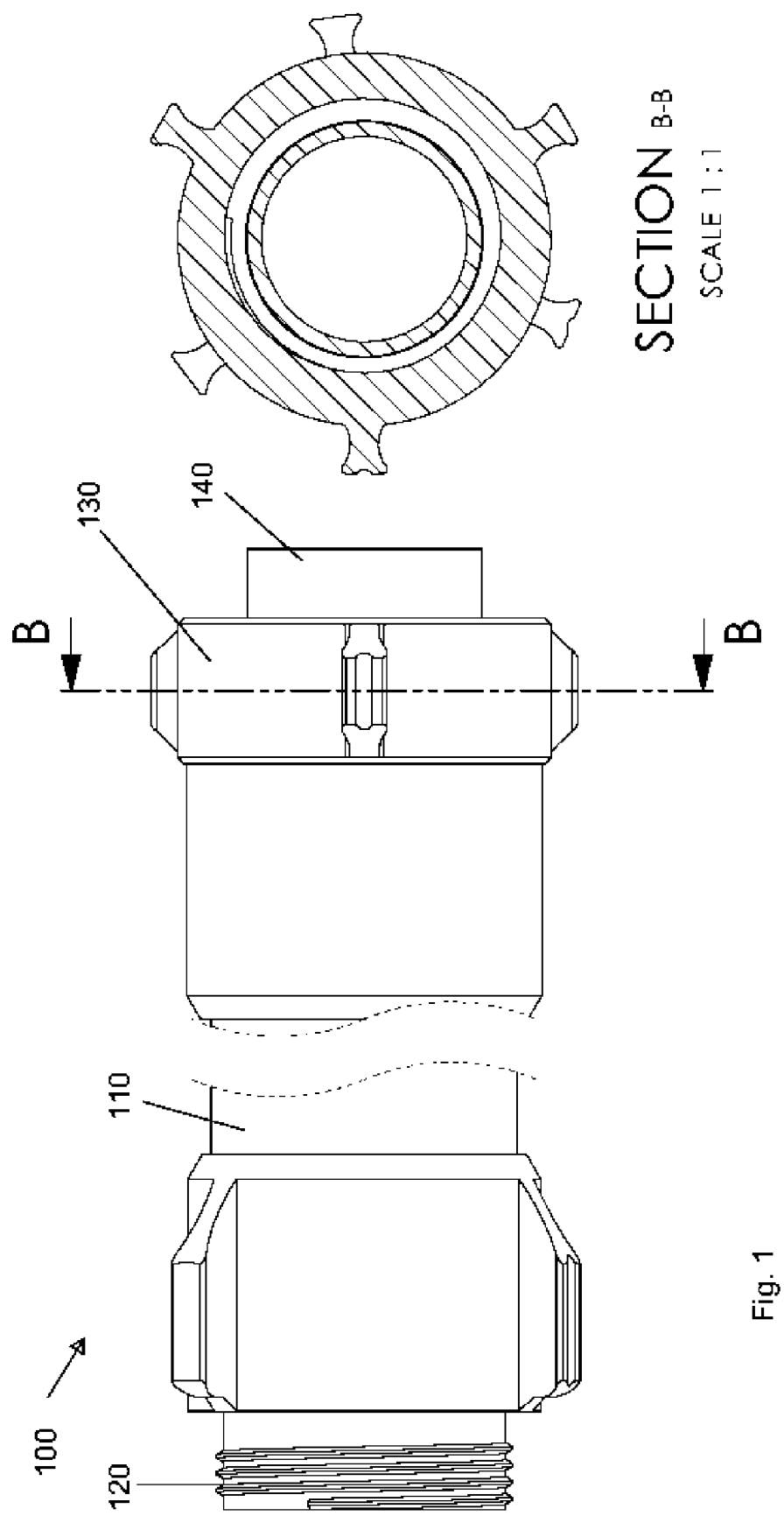
FIG. 1 depicts an extension assembly for a fire suppression spray nozzle according to one embodiment.
Figure 2:
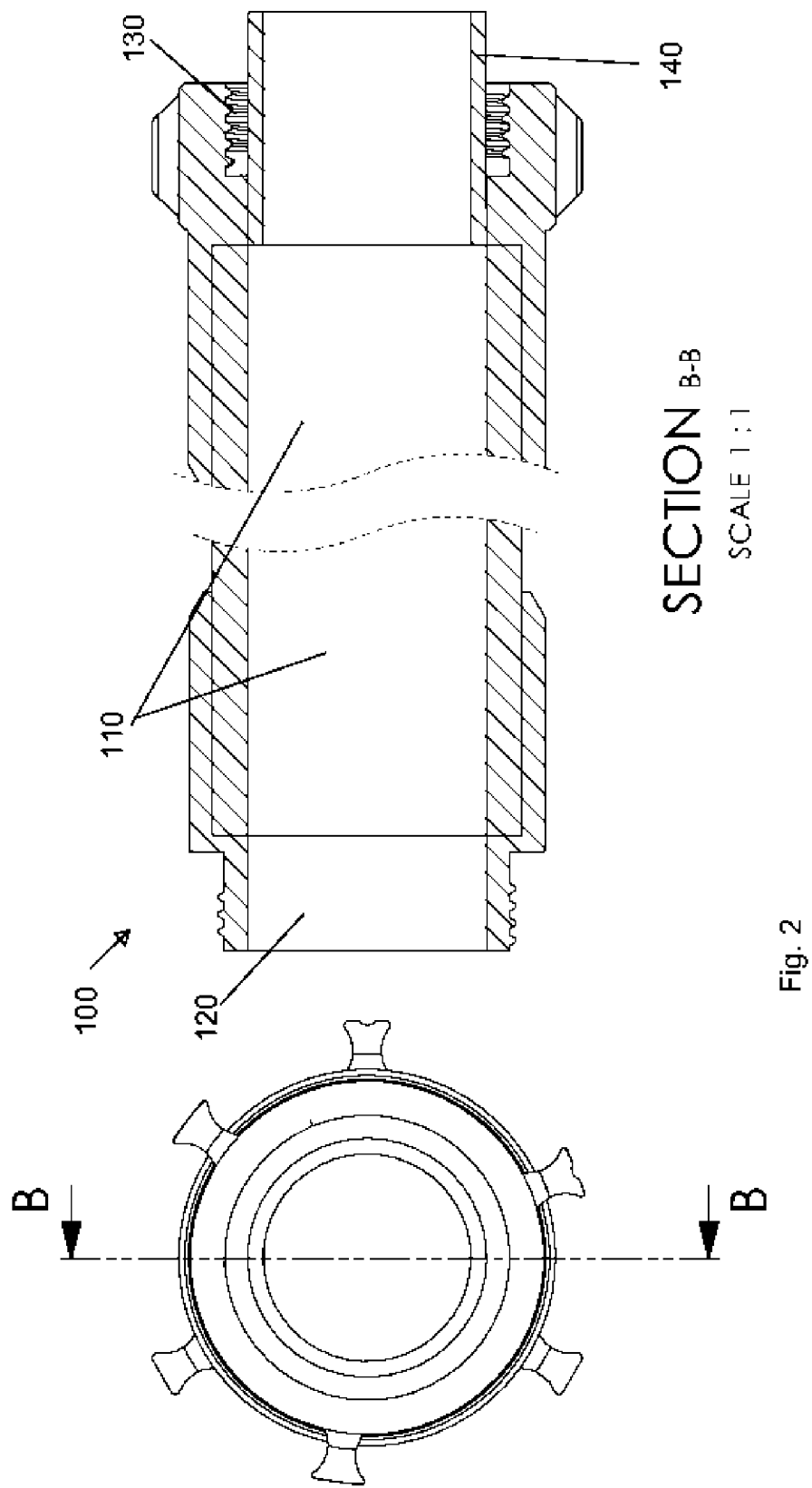
FIG. 2 depicts an extension assembly for a fire suppression spray nozzle according to one embodiment.
Figure 3:
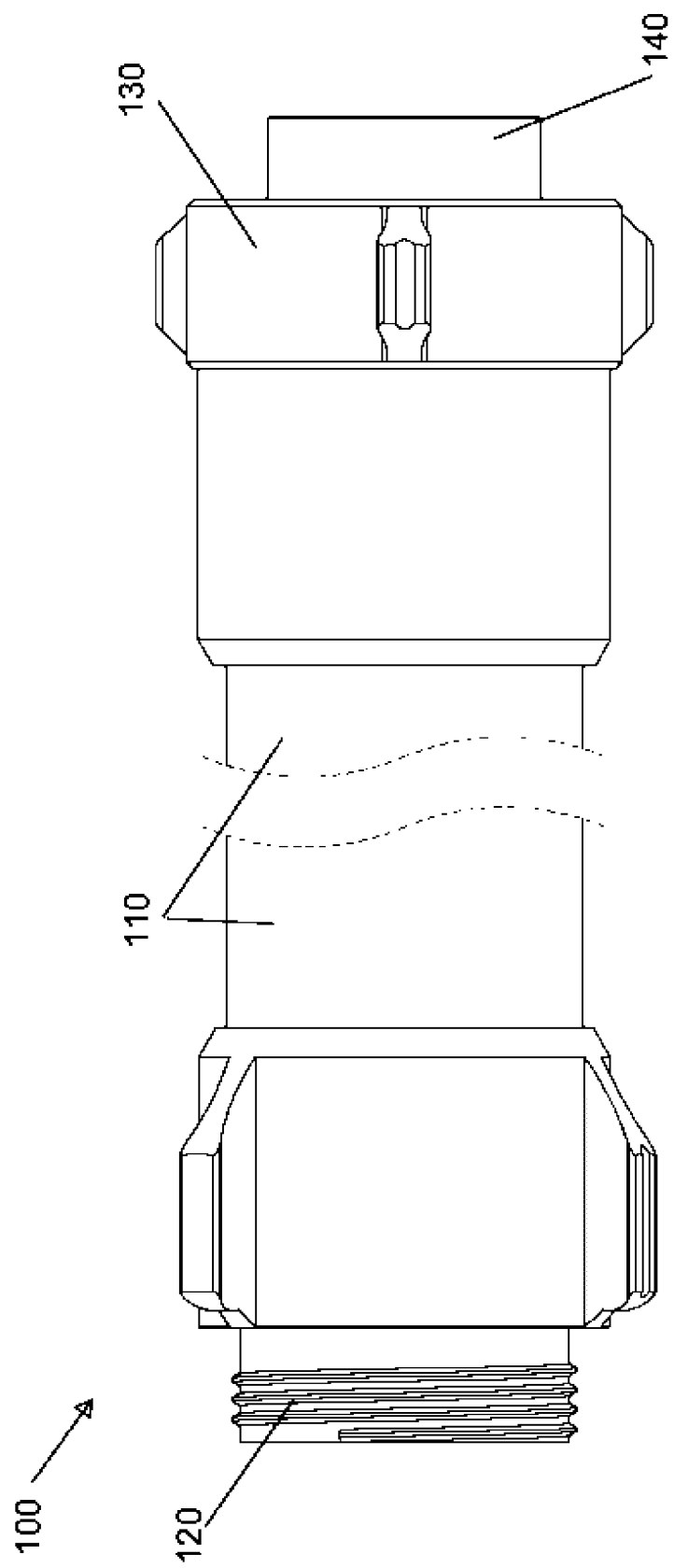
FIG. 3 depicts an extension assembly for a fire suppression spray nozzle according to one embodiment.

As shown in FIGS. 1-3, an extension assembly for a fire suppression spray nozzle 100, which may be referred to in this disclosure simply as extension assembly 100, comprises a tube 110 having a first end and a second end that is opposite to the first end. In one embodiment, tube 110 comprises an 8 foot length of tubing; however, any other length can be used for tube 110 without departing from the scope of the disclosure. A female hose coupler 130 is machined to fit onto the first end of tube 110 and then welded onto the first end of tube 110. A male hose coupler 120 is machined to fit onto the second end of tube 110 and then welded onto the second end of tube 110. Tube 110 and hose couplers 120, 130 may be hard-coat anodized to meet NFPA standards. A support sleeve 140 is connected to the female hose coupler 130 providing for easy assembly and added strength to the joint where the female hose coupler 130 connects to the male hose coupler 120 of another section of extension assembly 100 or to the male connector of other fire suppression equipment.

The nozzle used in connection with extension assembly 100 may be a Torpedo Nozzle manufactured by American Fire Equipment Co. The nozzle may be as described in U.S. patent Ser. No. 16/545,262 filed Aug. 20, 2019, the entirety of which is hereby incorporated by reference. The nozzle may be as described in U.S. patent Ser. No. 16/545,091 filed Aug. 20, 2019, the entirety of which is hereby incorporated by reference. Alternatively, the nozzle may be any another fire suppression spray nozzle.

Tube 110

Tube 110 provides an elongated and rigid structure configured to extend a nozzle connected to the furthest end of extension assembly 100 into a fire compartment. Tube 110 is the component of extension assembly 100 that gives extension assembly 100 its length and allows fire crews to work at greater distance from a fire or from an external position. Additionally, water, foam, or other fire suppressing fluid flows through tube 110 during operation of extension assembly 100.

In one arrangement, tube 110 may comprise a length of extruded structural seamless aluminum tubing such as a 6061 T6 aluminum tube. In other arrangements, tube 110 may comprise another metal or another suitable material without departing from the scope of the disclosure. Tube 110 may be anodized or hard coat anodized to meet NFPA standards. Tube 110 may comprise a 2 inch outer diameter and ⅛ inch thick wall. Alternatively, tube 110 may be of any other dimensions without departing from the scope of the disclosure.

Tube 110 comprises a first end and a second end, and each end of tube 110 may be welded onto a hose coupler 120 or 130 that has been machined to fit onto tube 110.

Hose Couplers 120 and 130

Welded onto the second end of the tube 110 is a male hose coupler 120 that has been machined to fit onto tube 110. Welded onto the first end of the tube 110 is a female hose coupler 130 that has been machined to fit onto tube 110. Tube 110 and hose couplers 120, 130 may be hard-coat anodized to meet NFPA standards.

Hose couplers 120, 130 may comprise threaded connectors configured to securely connect tube 110 to fire suppression spray nozzles, fire hoses, fire hydrants, other fire suppression equipment, and other sections of extension assembly 100. Hose couplers 120, 130 may comprise standard 1.5 inch NH hose couplers. In operation, hose couplers 120 and 130 prevent extension assembly 100 from disconnecting from fluid leakage fire suppression spray nozzles, fire hoses, fire hydrants, other fire suppression equipment, and other sections of extension assembly 100 as high pressure fluid moves between connected elements.

In one embodiment, hose couplers 120, 130 may be machined from 6061 extruded aluminum. In other embodiments, hose couplers 120, 130 may be formed from another suitable material without departing from the scope of the disclosure.

Support Sleeve 140

As shown in FIGS. 1-5, connected to female hose coupler 130 is a support sleeve 140. Support sleeve 140 allows for easy alignment of the threads of female hose coupler 130 to the threaded connectors of fire suppression spray nozzles, fire hoses, fire hydrants, other fire suppression equipment, and other sections of extension assembly 100. Support sleeve 140 also provides additional strength to the joint where the female hose coupler 130 connects to a nozzle or to the male hose coupler 120 of another section of extension assembly 100.

In one arrangement, support sleeve 140 is machined from 304 stainless steel. In other arrangements, support sleeve 140 may be formed from another metal or other suitable material without departing from the scope of the disclosure.

Figure 4:
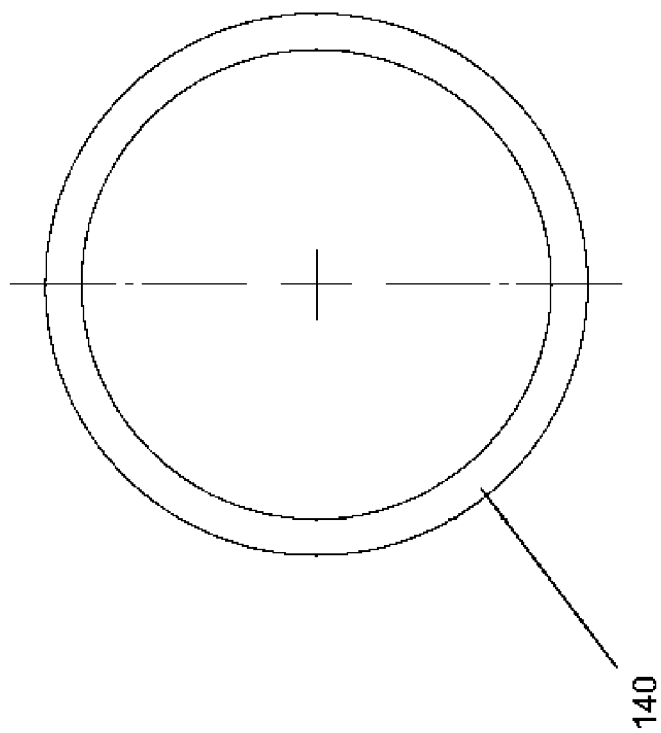
FIG. 4 depicts a support sleeve according to one embodiment.
Figure 4:
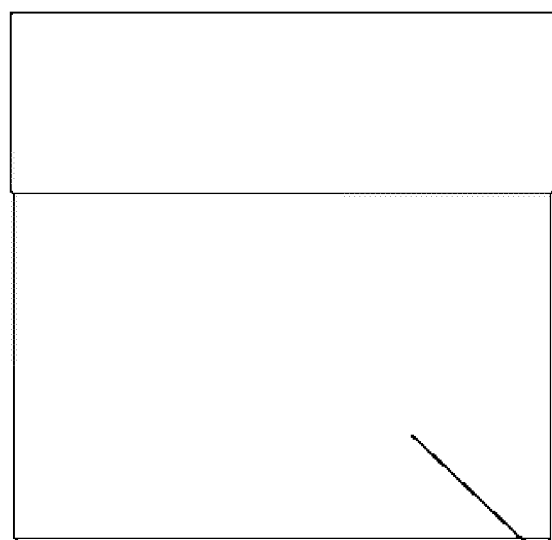
Figure 4:
Figure 5:
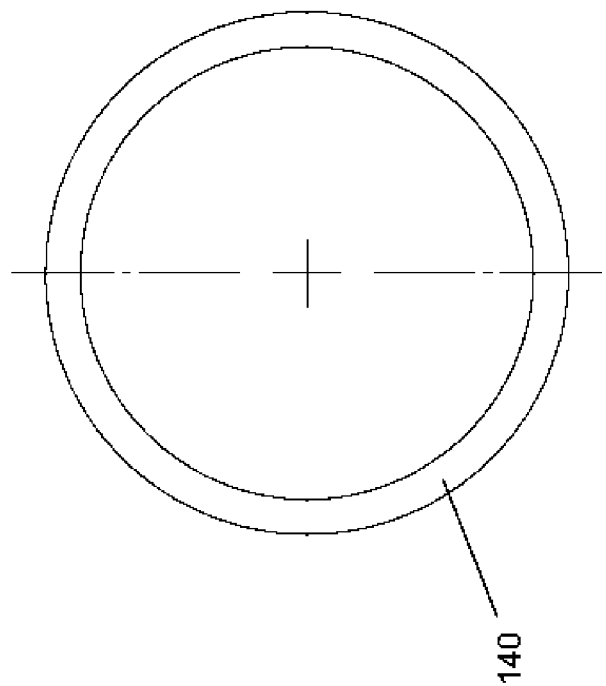
FIG. 5 depicts a support sleeve according to one embodiment.
Figure 5:
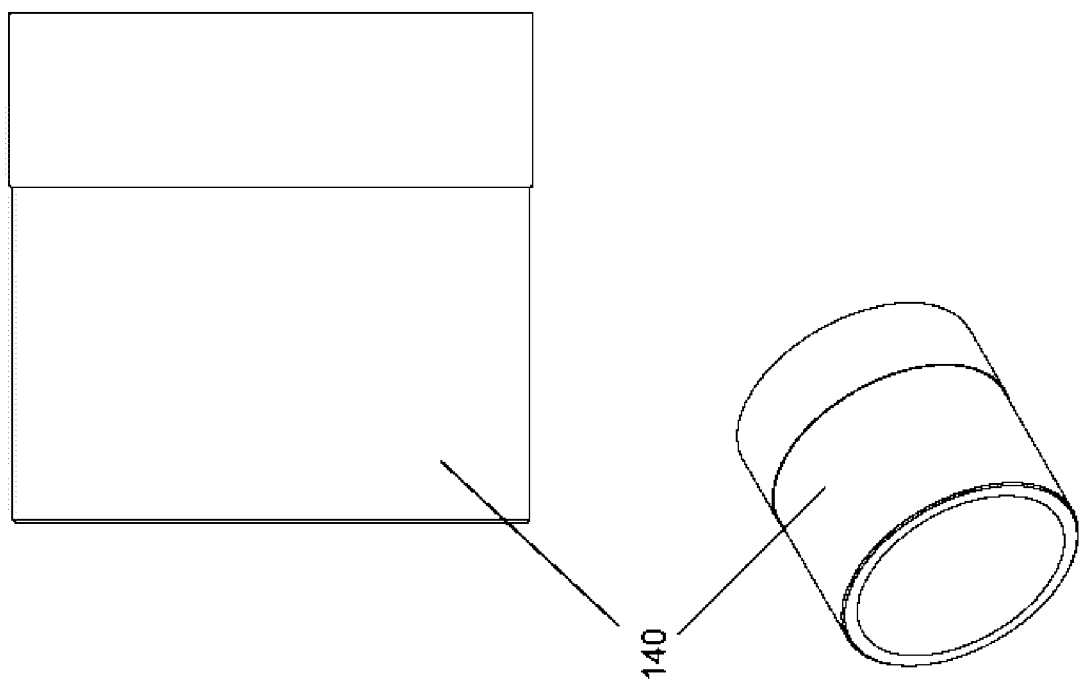

Support sleeve 140 is sized to be slightly smaller than the inner dimension bore of the female hose coupler 130. Support sleeve 140 is fit into the inner dimension bore of the female hose coupler 130, and a permanent retaining compound may be applied between the support sleeve 140 and the female hose coupler 130. In one embodiment, support sleeve 140 is press fit into the inner dimension bore of the female hose coupler 130; however, support sleeve 140 may be installed in other ways without departing from the scope of the disclosure. As shown in FIG. 4, in one embodiment, the portion of support sleeve 140 that fits inside the female hose coupler 130 may have an outer diameter of approximately 1.5350 inches, the portion of the support sleeve 140 that is disposed outside female hose coupler 130 may have an outer diameter of approximately 1.550 inches, the inner diameter of support sleeve 140 may be approximately 1.34250 inches, and the length of support sleeve 140 may be approximately 1.5150 inches; however, any diameter or length of support sleeve 140 may be used without departing from the scope of the disclosure.

Operation of Extension Assembly 100

In one arrangement, one instance of extension assembly 100 may be used to extend a fire suppression nozzle closer to or into a fire compartment. In such arrangements, a first end of a fire hose is connected to a source of water or other fire suppressing fluid, and the second end of the fire hose is connected to female hose coupler 130, and support sleeve 140 aids in aligning the threads of female hose coupler 130 to the threads of the fire hose as well as providing strength to the connection. A fire suppression nozzle is connected to male hose coupler 120. A shut-off valve may be installed at any connection point between the source of water or other fluid and the nozzle. For example, a shut-off valve may be attached between the source of water or other fluid and the first end of the fire hose, between the second end of the fire hose and the female hose coupler 130, or directly to the extension tube on its own. Once assembled, extension assembly 100 is extended toward a fire. Water or other fluid flows through tube 110 and into the nozzle, and the nozzle directs the water or fluid toward the fire. Extension assembly 100 may vary in length from 3 feet to 24 feet; however, extension assembly 100 may be other lengths without departing from the scope of the disclosure.

In other arrangements, any number of instances of extension assembly 100 may be connected together to extend the reach of a fire suppression nozzle. In such arrangements, a first end of a fire hose is connected to a source of water or other fire suppressing fluid, and the second end of the fire hose is connected to female hose coupler 130 of a first instance of extension assembly 100, and support sleeve 140 aids in aligning the threads of female hose coupler 130 to the threads of the nozzle as well as providing strength to the connection. The female hose coupler 130 of a second instance of extension assembly 100 is connected to the male hose coupler 120 of the first instance of extension assembly 100, and support sleeve 140 aids in aligning the threads of the female hose coupler 130 to the threads of male hose coupler 120 as well as providing strength to the connection. Additional instances of extension assembly 100 are similarly attached until the desired length of the combined extension assemblies 100 is reached. A fire suppression nozzle is connected to the male hose coupler 120 of the extension assembly 100 that is furthest from the first instance of extension assembly 100. A shut-off valve may be installed at any connection point between the source of water or other fluid and the nozzle. For example, a shut-off valve may be attached between the source of water or other fluid and the first end of the fire hose, between the second end of the fire hose and the female hose coupler 130 of the first instance of extension assembly 100, between the female hose coupler 130 of any instance of extension assembly 100 and the male hose coupler 120 of an adjacent extension assembly 100, or directly to the extension tube on its own. Once assembled, the combined extension assemblies 100 are extended toward a fire. Water or other fluid flows through tubes 110 and into the nozzle, and the nozzle directs the water or fluid toward the fire. Each instance of extension assembly 100 may vary in length from 3 feet to 24 feet; however, each instance of extension assembly 100 may be other lengths without departing from the scope of the disclosure. By connecting multiple instances of extension assembly 100 together, any length may be achieved with the combined extension assemblies 100.

Through use of extension assembly 100, fire crews may reach the seat of the fire and more effectively extinguish fires while distancing themselves from the point of discharge.

The extension assembly 100 has many benefits and advantages including, but not limited to reducing the amount of time needed to extinguish fires from an external position, increased safety for fire crews by limiting harmful exposure, increased ability to reduce interior compartment heat to increase fire victims' survivability and reduce exposure to heat and fire for firefighter and rescue operations, and reduced water usage resulting from faster fire suppression. These and other benefits and advantages of the extension assembly 100 are apparent from the specification and claims.

REFERENCE NUMERALS

100—Extension assembly
110—Tube
120—Male hose coupler
130—Female hose coupler
140—Support sleeve

What is claimed:

1. An extension assembly for a fire suppression spray nozzle comprising:
   a tube having a first end and a second end, wherein an inner-dimension bore runs between the first end and the second end and the inner-dimension bore has a diameter;
   a female hose coupler connected to the first end of the tube; the female hose coupler having an inner dimension bore;
   a male hose coupler connected to the second end of the tube; and
   a support sleeve press fit into the inner dimension bore of the female hose coupler, wherein the support sleeve has an outer diameter approximately equal to the diameter of the inner dimension bore of the tube and a length, wherein a portion of the length of the support sleeve extends out of the female hose coupler, and wherein the support sleeve is configured to align fire suppression equipment connecting to the female hose coupler by inserting the portion of the length of the support sleeve that extends out of the female hose coupler into an inner-dimension bore of the fire suppression equipment connecting to the female hose coupler.

2. The extension assembly for a fire suppression spray nozzle of claim 1 wherein the tube comprises an extruded structural aluminum tube.

3. The extension assembly for a fire suppression spray nozzle of claim 1 wherein the tube, male hose coupler, and female hose coupler are hard coat anodized.

4. The extension assembly for a fire suppression spray nozzle of claim 1 wherein the support sleeve comprises stainless steel.

* * * * *

UNITED STATES PATENT AND TRADEMARK OFFICE
CERTIFICATE OF CORRECTION

| | | |
|---|---|---|
| PATENT NO. | : 12,163,608 B2 | Page 1 of 1 |
| APPLICATION NO. | : 17/695425 | |
| DATED | : December 10, 2024 | |
| INVENTOR(S) | : Craig D. Hillinger | |

It is certified that error appears in the above-identified patent and that said Letters Patent is hereby corrected as shown below:

On the Title Page

Item [73], The name of the Assignee is "American Fire Equipment, Inc." not "Emergency Vehicle Center & American Fire Equipment, Inc.".

Signed and Sealed this
Twenty-ninth Day of April, 2025

Coke Morgan Stewart
*Acting Director of the United States Patent and Trademark Office*